(12) United States Patent  
Scott (10) Patent No.: US 7,543,133 B1  
(45) Date of Patent: Jun. 2, 2009

(54) LATENCY TOLERANT DISTRIBUTED SHARED MEMORY MULTIPROCESSOR COMPUTER

(75) Inventor: Steven L. Scott, Eau Claire, WI (US)

(73) Assignee: Cray Inc., Seattle, WA (US)

( * ) Notice: Subject to any disclaimer, the term of this patent is extended or adjusted under 35 U.S.C. 154(b) by 187 days.

(21) Appl. No.: 10/643,585

(22) Filed: Aug. 18, 2003

(51) Int. Cl.  
 *G06F 12/00* (2006.01)
(52) U.S. Cl. .................................... 711/205; 711/147
(58) Field of Classification Search ................. 711/147, 711/205  
See application file for complete search history.

(56) References Cited

U.S. PATENT DOCUMENTS

| | | | |
|---|---|---|---|
| RE28,577 E | 10/1975 | Schmidt | |
| 4,412,303 A | 10/1983 | Barnes et al. | |
| 4,414,624 A | 11/1983 | Summer, Jr. et al. | |
| 4,541,046 A | 9/1985 | Nagashima et al. | |
| 4,771,391 A | 9/1988 | Blasbalg | |
| 4,868,818 A | 9/1989 | Madan et al. | |
| 4,888,679 A * | 12/1989 | Fossum et al. | 712/6 |
| 4,933,933 A | 6/1990 | Dally et al. | |
| 4,989,131 A | 1/1991 | Stone | |
| 5,008,882 A | 4/1991 | Peterson et al. | |
| 5,012,409 A | 4/1991 | Fletcher et al. | |
| 5,031,211 A | 7/1991 | Nagai et al. | |
| 5,036,459 A | 7/1991 | Den Haan et al. | |
| 5,068,851 A | 11/1991 | Bruckert et al. | |
| 5,105,424 A | 4/1992 | Flaig et al. | |
| 5,157,692 A | 10/1992 | Horie et al. | |
| 5,161,156 A | 11/1992 | Baum et al. | |
| 5,170,482 A | 12/1992 | Shu et al. | |
| 5,175,733 A | 12/1992 | Nugent | |
| 5,197,130 A | 3/1993 | Chen et al. | |
| 5,218,601 A | 6/1993 | Chujo et al. | |
| 5,218,676 A | 6/1993 | Ben-Ayed et al. | |
| 5,239,545 A | 8/1993 | Buchholz | |
| 5,247,635 A | 9/1993 | Kamiya | |

(Continued)

FOREIGN PATENT DOCUMENTS

EP 0353819 2/1990

(Continued)

OTHER PUBLICATIONS

Gharachorloo, Kourosh, "Two Techniques to Enhance the Performance of Memory Consistency Models", *Proceedings of the International Conference on Parallel Processing*, (1991),1-10.

(Continued)

*Primary Examiner*—Matthew Kim  
*Assistant Examiner*—Sheng-Jen Tsai  
(74) *Attorney, Agent, or Firm*—Schwegman, Lundberg & Woessner, P.A.

(57) ABSTRACT

A computer system having low memory access latency. In one embodiment, the computer system includes a network and one or more processing nodes connected via the network, wherein each processing node includes a plurality of processors and a shared memory connected to each of the processors. The shared memory includes a cache. Each processor includes a scalar processing unit, a vector processing unit and means for operating the scalar processing unit independently of the vector processing unit. Processors on one node can load data directly from and store data directly to shared memory on another processing node via the network.

15 Claims, 7 Drawing Sheets

U.S. PATENT DOCUMENTS

| | | | |
|---|---|---|---|
| 5,247,639 A | 9/1993 | Yamahata | |
| 5,247,691 A | 9/1993 | Sakai | |
| 5,276,899 A | 1/1994 | Neches | |
| 5,280,474 A | 1/1994 | Nickolls et al. | |
| 5,313,628 A | 5/1994 | Mendelsohn et al. | |
| 5,313,645 A | 5/1994 | Rolfe | |
| 5,331,631 A | 7/1994 | Teraslinna | |
| 5,333,279 A | 7/1994 | Dunning | |
| 5,341,482 A | 8/1994 | Cutler et al. | |
| 5,341,504 A | 8/1994 | Mori et al. | |
| 5,347,450 A | 9/1994 | Nugent | |
| 5,353,283 A | 10/1994 | Tsuchiya | |
| 5,365,228 A | 11/1994 | Childs et al. | |
| 5,375,223 A | 12/1994 | Meyers et al. | |
| 5,418,916 A | 5/1995 | Hall et al. | |
| 5,430,850 A | 7/1995 | Papadopoulos et al. | |
| 5,430,884 A | 7/1995 | Beard et al. | |
| 5,434,995 A | 7/1995 | Oberlin et al. | |
| 5,440,547 A | 8/1995 | Easki et al. | |
| 5,446,915 A | 8/1995 | Pierce | |
| 5,517,497 A | 5/1996 | LeBoudec et al. | |
| 5,530,933 A | 6/1996 | Frink et al. | |
| 5,546,549 A | 8/1996 | Barrett et al. | |
| 5,548,639 A | 8/1996 | Ogura et al. | |
| 5,550,589 A | 8/1996 | Shiojiri et al. | |
| 5,555,542 A | 9/1996 | Ogura et al. | |
| 5,560,029 A | 9/1996 | Papadopoulos et al. | |
| 5,606,696 A | 2/1997 | Ackerman et al. | |
| 5,613,114 A | 3/1997 | Anderson et al. | |
| 5,640,524 A | 6/1997 | Beard et al. | |
| 5,649,141 A | 7/1997 | Yamazaki | |
| 5,684,977 A | 11/1997 | Van Loo et al. | |
| 5,717,895 A | 2/1998 | Leedom et al. | |
| 5,721,921 A | 2/1998 | Kessler et al. | |
| 5,765,009 A | 6/1998 | Ishizaka | |
| 5,781,775 A | 7/1998 | Ueno | |
| 5,787,494 A | 7/1998 | DeLano et al. | |
| 5,796,980 A | 8/1998 | Bowles | |
| 5,812,844 A | 9/1998 | Jones et al. | |
| 5,835,951 A | 11/1998 | McMahan | |
| 5,860,146 A * | 1/1999 | Vishin et al. | 711/207 |
| 5,897,664 A * | 4/1999 | Nesheim et al. | 711/206 |
| 5,978,830 A | 11/1999 | Nakaya et al. | |
| 5,987,571 A | 11/1999 | Shibata et al. | |
| 5,995,752 A | 11/1999 | Chao et al. | |
| 6,003,123 A | 12/1999 | Carter et al. | |
| 6,014,728 A | 1/2000 | Baror | |
| 6,047,323 A | 4/2000 | Krause | |
| 6,088,701 A | 7/2000 | Whaley et al. | |
| 6,101,590 A * | 8/2000 | Hansen | 711/203 |
| 6,105,113 A * | 8/2000 | Schimmel | 711/146 |
| 6,161,208 A | 12/2000 | Dutton et al. | |
| 6,247,169 B1 | 6/2001 | DeLong | |
| 6,269,390 B1 | 7/2001 | Boland | |
| 6,269,391 B1 | 7/2001 | Gillespie | |
| 6,308,250 B1 | 10/2001 | Klausler | |
| 6,308,316 B1 | 10/2001 | Hashimoto et al. | |
| 6,317,819 B1 | 11/2001 | Morton | |
| 6,336,168 B1 | 1/2002 | Frederick, Jr. et al. | |
| 6,339,813 B1 | 1/2002 | Smith et al. | |
| 6,356,983 B1 | 3/2002 | Parks | |
| 6,385,715 B1 | 5/2002 | Merchant et al. | |
| 6,389,449 B1 | 5/2002 | Nemirovsky et al. | |
| 6,393,536 B1 | 5/2002 | Hughes et al. | |
| 6,430,649 B1 | 8/2002 | Chaudhry et al. | |
| 6,490,671 B1 * | 12/2002 | Frank et al. | 711/207 |
| 6,496,902 B1 | 12/2002 | Faanes et al. | |
| 6,496,925 B1 | 12/2002 | Rodgers et al. | |
| 6,519,685 B1 | 2/2003 | Chang | |
| 6,553,486 B1 | 4/2003 | Ansari | |
| 6,591,345 B1 | 7/2003 | Seznec | |
| 6,615,322 B2 | 9/2003 | Arimilli et al. | |
| 6,665,774 B2 | 12/2003 | Faanes et al. | |
| 6,684,305 B1 * | 1/2004 | Deneau | 711/159 |
| 6,782,468 B1 * | 8/2004 | Nakazato | 712/9 |
| 6,816,960 B2 | 11/2004 | Koyanagi | |
| 6,879,948 B1 | 4/2005 | Chalfin et al. | |
| 6,910,213 B1 | 6/2005 | Hirono et al. | |
| 6,922,766 B2 * | 7/2005 | Scott | 711/202 |
| 6,925,547 B2 * | 8/2005 | Scott et al. | 711/207 |
| 6,952,827 B1 | 10/2005 | Alverson et al. | |
| 6,976,155 B2 | 12/2005 | Drysdale et al. | |
| 7,028,143 B2 | 4/2006 | Barlow et al. | |
| 7,089,557 B2 | 8/2006 | Lee | |
| 7,103,631 B1 | 9/2006 | van der Veen | |
| 7,111,296 B2 | 9/2006 | Wolrich et al. | |
| 7,137,117 B2 | 11/2006 | Ginsberg | |
| 7,143,412 B2 | 11/2006 | Koenen | |
| 7,162,713 B2 | 1/2007 | Pennello | |
| 7,191,444 B2 | 3/2007 | Alverson et al. | |
| 7,334,110 B1 | 2/2008 | Faanes et al. | |
| 7,366,873 B1 | 4/2008 | Kohn | |
| 7,421,565 B1 | 9/2008 | Kohn | |
| 7,437,521 B1 | 10/2008 | Scott et al. | |
| 2002/0078122 A1 | 6/2002 | Joy et al. | |
| 2002/0091747 A1 | 7/2002 | Rehg et al. | |
| 2002/0116600 A1 | 8/2002 | Smith | |
| 2002/0169938 A1 | 11/2002 | Scott et al. | |
| 2002/0172199 A1 | 11/2002 | Scott et al. | |
| 2003/0005380 A1 | 1/2003 | Nguyen et al. | |
| 2003/0018875 A1 | 1/2003 | Henry et al. | |
| 2003/0097531 A1 | 5/2003 | Arimilli et al. | |
| 2003/0167383 A1 | 9/2003 | Gupta et al. | |
| 2003/0196035 A1 | 10/2003 | Akkary | |
| 2004/0044872 A1 | 3/2004 | Scott | |
| 2004/0064816 A1 | 4/2004 | Alverson et al. | |
| 2004/0162949 A1 | 8/2004 | Scott | |
| 2005/0044128 A1 | 2/2005 | Scott et al. | |
| 2005/0044339 A1 | 2/2005 | Sheets | |
| 2005/0044340 A1 | 2/2005 | Sheets et al. | |
| 2005/0125801 A1 | 6/2005 | King | |
| 2007/0283127 A1 | 12/2007 | Kohn et al. | |

FOREIGN PATENT DOCUMENTS

| | | |
|---|---|---|
| EP | 0353819 A2 | 2/1990 |
| EP | 0475282 | 9/1990 |
| EP | 0473452 | 3/1992 |
| EP | 0473452 A2 | 3/1992 |
| EP | 0475282 A2 | 3/1992 |
| EP | 0501524 | 9/1992 |
| EP | 0501524 A2 | 9/1992 |
| EP | 0570729 | 11/1993 |
| EP | 0570729 A2 | 11/1993 |
| WO | WO-87/01750 | 3/1987 |
| WO | WO-8701750 A1 | 3/1987 |
| WO | WO-88/08652 | 11/1988 |
| WO | WO-8808652 A1 | 11/1988 |
| WO | WO-95/16236 | 6/1995 |
| WO | WO-9516236 | 6/1995 |
| WO | WO-9610283 A1 | 4/1996 |
| WO | WO-9632681 A1 | 10/1996 |

OTHER PUBLICATIONS

"Cray Assembly Language (CAL) for Cray X1™ Systems Reference Manual", *Section 2.6, Memory Ordering*, http://docs.cray.com/books/S-2314-51/index.html, (Jun. 2003), 302 pgs.

"ECPE 4504: Computer Organization Lecture 12: Computer Arithmetic", The Bradley Department of Electrical Engineering, (Oct. 17, 2000), 12 pgs.

"Msync—Synchronise Memory with Physical Storage", *The Single UNIX® Specification, Verison 2: Msync, The Open Group*, http://www.opengroup.org/onlinepubs/007908799/xsh/msync.html, (1997), 3 pgs.

Abts, D., "So Many States, So Little Time: Verifying Memory Coherence in the Cray X1", *Parallel and Distributed Processing Symposium*, (Apr. 22, 2003), 11-20.

Cohoon, James, et al., "C++ Program Design", *McGraw-Hill Companies Inc. 2nd Edition*, (1999), p. 493.

Ernst, D., et al., "Cyclone: A Broadcast-Free Dynamic Instruction Scheduler with Selective Replay", *30th Annual International Symposium on Computer Architecture (ISCA-2003)*, (Jun. 2003), 10 pgs.

Patterson, D. A., et al., *Computer Architecture: A Quantitative Approach*, 2nd Edition, Morgan Kaufmann Publishers, Inc., San Francisco, CA, (1996), 39-41.

Patterson, D. A., et al., *Computer Architecture: A Quantitative Approach*, 2nd Edition, Morgan Kaufmann Publishers, Inc., San Francisco, CA, (1996), 699-708.

Patterson, D. A., et al., *Computer Architecture: A Quantitative Approach*, 2nd Edition, Morgan Kaufmann Publsihers, Inc., San Francisco, CA, (1996), 179-187, 373-384.

Patterson, D. A., et al., *Computer Architecture: A Quantitative Approach*, 2nd Edition, Morgan Kaufmann Publishers, Inc., San Francisco, CA, (1996), 194-197.

Patterson, D. A., et al., *Computer Architecture A Quantitative Approach*, Morgan Kaufmann Publishers, Inc., Second Edition, (1996),255-260 & 308-317.

Patterson, D., et al., "Computer Architecture: A Quantitative Approach", *Morgan-Kaufmann Publishers, Second Edition*, (1996),241-243.

U.S. Appl. No. 10/643,574, Non-Final Office Action Mailed Aug. 7, 2007, 31 pgs.

U.S. Appl. No. 10/643,574, Advisory Action mailed May 21, 2007, 3 pgs.

U.S. Appl. No. 10/643,574, Final Office Action mailed Mar. 5, 2007, 31 pgs.

U.S. Appl. No. 10/643,574, Non-Final Office Action mailed Jan. 30, 2006, 33 pgs.

U.S. Appl. No. 10/643,574, Non-Final Office Action mailed Jul. 28, 2006, 30 pgs.

U.S. Appl. No. 10/643,574, RCE and Response Under 37 C.F.R. 1.116 filed Jul. 12, 2007 to Final Office Action mailed Mar. 5, 2007, 19 pgs.

U.S. Appl. No. 10/643,574, Response filed Nov. 28, 2006 to Non-Final Office Action mailed Jul. 28, 2006, 15 pgs.

U.S. Appl. No. 10/643,574, Response filed May 1, 2006 to Non-Final Office Action mailed Jan. 30, 2006, 29 pgs.

U.S. Appl. No. 10/643,574, Response filed May 4, 2007 to Final Office Action mailed Mar. 5, 2007, 15 pgs.

U.S. Appl. No. 10/643,586, Advisory Action mailed Jan. 18, 2007, 3 pgs.

U.S. Appl. No. 10/643,586, Final Office Action mailed Oct. 19, 2006, 27 pgs.

U.S. Appl. No. 10/643,586, Non-Final Office Action mailed Feb. 8, 2006, 21 pgs.

U.S. Appl. No. 10/643,586, Non-Final Office Action mailed May 2, 2007, 36 pgs.

U.S. Appl. No. 10/643,586, RCE and Amendment and Response filed Feb. 16, 2007 to Final Office Action mailed Oct. 19, 2006 and the Advisory Action mailed Jan. 18, 2007, 19 pgs.

U.S. Appl. No. 10/643,586, Response filed Jan. 5, 2007 to Final Office Action mailed Oct. 19, 2006, 22 pgs.

U.S. Appl. No. 10/643,586, Response filed Aug. 1, 2006 to Non-Final Office Action mailed Feb. 8, 2006, 24 pgs.

U.S. Appl. No. 10/643,587, Amendment and Response filed Aug. 13, 2007 to Non-Final Office Action mailed May 8, 2007, 20 pgs.

U.S. Appl. No. 10/643,587, Non-Final Office Action mailed May 8, 2007, 14 pgs.

U.S. Appl. No. 10/643,727, Non-Final Office Action mailed Feb. 16, 2006, 33 pgs.

U.S. Appl. No. 10/643,727, Non-Final Office Action mailed Aug. 11, 2006, 29 pgs.

U.S. Appl. No. 10/643,727, Notice of Allowance mailed Feb. 28, 2007, 5 pgs.

U.S. Appl. No. 10/643,727, Notice of Allowance mailed Jul. 19, 2007, 5 pgs.

U.S. Appl. No. 10/643,727, Response filed Jan. 11, 2007 to Non-Final Office Action mailed Aug. 11, 2006, 15 pgs.

U.S. Appl. No. 10/643,727, Response filed Jun. 15, 2006 to Non-Final Office Action mailed Feb. 16, 2006, 21 pgs.

U.S. Appl. No. 10/643,738, Response filed Jan. 16, 2006 to Non-Final Office Action mailed Sep. 26, 2005, 13 pgs.

U.S. Appl. No. 10/643,738, Response filed Jul. 19, 2006 to Non-Final Office Action mailed Feb. 17, 2006, 10 pgs.

U.S. Appl. No. 10/643,738, Final Office Action mailed Apr. 17, 2007, 12 pgs.

U.S. Appl. No. 10/643,738, Non-Final Office Action mailed Feb. 17, 2006, 9 pgs.

U.S. Appl. No. 10/643,738, Non-Final Office Action mailed Sep. 26, 2005, 11 pgs.

U.S. Appl. No. 10/643,738, Response filed Jul. 17, 2007 to Final Office Action mailed Apr. 17, 2007, 17 pgs.

U.S. Appl. No. 10/643,741, Non-Final Office Action mailed Apr. 5, 2007, 19 pgs.

U.S. Appl. No. 10/643,741, Response filed Jun. 4, 2007 to Non-Final Office Action mailed Apr. 5, 2007, 16 pgs.

U.S. Appl. No. 10/643,742, Non-Final Office Action mailed Jun. 4, 2007, 13 pgs.

U.S. Appl. No. 10/643,754, Advisory Action mailed Nov. 22, 2006, 3 pgs.

U.S. Appl. No. 10/643,754, Final Office action mailed Sep. 14, 2006, 21 pgs.

U.S. Appl. No. 10/643,754, Non-Final Office Action mailed Feb. 8, 2006, 16 pgs.

U.S. Appl. No. 10/643,754, Non-Final Office Action mailed Jul. 5, 2007, 23 pgs.

U.S. Appl. No. 10/643,754, Response filed Nov. 7, 2006 to Final Office Action mailed Sep. 14, 2006, 12 pgs.

U.S. Appl. No. 10/643,754, Response filed Mar. 30, 2007 to Advisory Action mailed Nov. 22, 2006, 10 pgs.

U.S. Appl. No. 10/643,754, Response filed Jul. 10, 2006 to Non-Final Office Action mailed Feb. 8, 2006, 12 pgs.

U.S. Appl. No. 10/643,758, Notice of Allowance mailed Jul. 19, 2007, 4 pgs.

U.S. Appl. No. 10/643,758, Advisory Action mailed May 1, 2007, 3 pgs.

U.S. Appl. No. 10/643,758, Amendment and Response filed Jul. 10, 2006 to Final Office Action Mar. 10, 2006, 9 pgs.

U.S. Appl. No. 10/643,758, Final Office Action mailed Feb. 6, 2007, 23 pgs.

U.S. Appl. No. 10/643,758, Final Office Action mailed Mar. 10, 2006, 13 pgs.

U.S. Appl. No. 10/643,758, Non-Final Office Action mailed Aug. 15, 2006, 15 pgs.

U.S. Appl. No. 10/643,758, Non-Final Office Action mailed Aug. 30, 2005, 8 pgs.

U.S. Appl. No. 10/643,758, Response filed Jan. 30, 2006 to Non-Final Office Action mailed Aug. 30, 2005, 9 pgs.

U.S. Appl. No. 10/643,758, Response filed Dec. 14, 2006 to Non-Final Office Action mailed Aug. 15, 2006, 17 pgs.

U.S. Appl. No. 10/643,758, Response filed Apr. 17, 2007 to Final Office Action mailed Feb. 6, 2007, 25 pgs.

U.S. Appl. No. 10/643,767, Non-Final Office Action mailed Oct. 6, 2006, 7 pgs.

U.S. Appl. No. 10/643,769, Response filed Jul. 23, 2007 to Non-Final Office Action mailed Apr. 23, 2007, 12 pgs.

U.S. Appl. No. 10/643,769, Non-Final Office Action mailed Apr. 23, 2007, 13 pgs.

Patterson, D., et al., "Computer Architecture: A Quantitative Approach", Second Edition, Morgan Kaufmann Publishers Inc. ,(1996),251-256.

*The Authoritative Dictionary of IEEE Standards Terms,*, Standards Information Network IEEE Press,(2000), 1003.

"U.S. Appl. No. 10/235,898 Non Final Office Action mailed Jul. 7, 2004", 12 pgs.

"U.S. Appl. No. 10/235,898 Notice of Allowance mailed Mar. 15, 2005", 4 pgs.

"U.S. Appl. No. 10/235,898 Response filed Jan. 6, 2005 to Non Final Office Action mailed Jul. 7, 2004", 16 pgs.

"U.S. Appl. No. 10/643,574, Notice of Allowance mailed Dec. 5, 2007", NOAR,5 pgs.
"U.S. Appl. No. 10/643,574, Response filed Nov. 7, 2007 to Non-final Office Action mailed Aug. 7, 2007", 15 pgs.
"U.S. Appl. No. 10/643, 574 Response filed Jul. 12, 2007 to Advisory Action mailed Mar. 5, 207", 16 pgs.
"U.S. Appl. No. 10/643,577, Non-Final Office Action mailed Mar. 20, 2006", 13 pgs.
"U.S. Appl. No. 10/643,577, Non-Final Office Action mailed Jul. 27, 2007", OARN,14 pgs.
"U.S. Appl. No. 10/643,577, Response filed Jan. 23, 2008 to Non-Final Office Action mailed Jul. 27, 2007", 18 pgs.
"U.S. Appl. No. 10/643,577, Response filed May 2, 2007 to Final Office Action mailed Nov. 2, 2007", 12 pgs.
"U.S. Appl. No. 10/643,577, Response filed Aug. 21, 2006 to Non-Final Office Action mailed Mar. 20, 2006", 14 pgs.
"U.S. Appl. No. 10/643,585, Request for Continued Examination filed Sep. 14, 2006", 1 pg.
"U.S. Appl. No. 10/643,586, Notice of Allowance mailed Oct. 23, 2007", 5 pgs.
"U.S. Appl. No. 10/643,586, Response filed Feb. 16, 2007 to Advisory Action mailed Oct. 19, 2006", 18 pgs.
"U.S. Appl. No. 643,587, Final Office Action mailed Oct. 31, 2007", FOAR,19 pgs.
"U.S. Appl. No. 10/643,727, Notice of Allowance mailed Nov. 27, 2007", NOAR,5 pgs.
"U.S. Appl. No. 10/643,738, Non-Final Office Action mailed Nov. 1, 2007", 19 pgs.
"U.S. Appl. No. 10/643,741 Final Office Action mailed Sep. 11, 2007", 26 pgs.
"U.S. Appl. No. 10/643,741, Amendment and Response mailed Nov. 13, 2007 to Final Office Action mailed Sep. 11, 2007", 14 pgs.
"U.S. Appl. No. 10/643,741, Notice of Allowance mailed Feb. 12, 2008", NOAR,3 pgs.
"U.S. Appl. No. 10/643,742, Response filed Oct. 11, 2007 to Non-Final Office Action mailed Jun. 4, 2007", 18 pages.
"U.S. Appl. No. 10/643,754, Amendment & Response filed Jan. 25, 2008 to Final Office Action mailed Nov. 25, 2007", 20 pgs.
"U.S. Appl. No. 10/643,754, Final Office Action mailed Nov. 26, 2007", 29 pgs.
"U.S. Appl. No. 10/643,754, Amendment & Response filed Oct. 9, 2007 to Non-final OA mailed Jul. 5, 2007", 14 pgs.
"U.S. Appl. No. 10/643,758 Notice of Allowance mailed Oct. 19, 2007", 4 pgs.
"U.S. Appl. No. 10/643,769, Notice of Allowance mailed Jan.15, 2008", NOAR,4 pgs.
"U.S. Appl. No. 10/643,769, Notice of Allowance Mailed Oct. 29, 2007", 17 pgs.
"Deadlock-Free Routing Schemes on Multistage Interconnection Networks", *IBM Technical Disclosure Bulletin*, 35, (Dec. 1992),232-233.
"International Search Report for corresponding PCT Application No. PCT/US2004/026814", (Mar. 10, 2005),2 pgs.
"International Search Report for International Application No. PCT/IE95/00047", Date of Completion - Dec. 22, 1995; Authorized Officer - R. Salm.
"International Search Report for International Application No. PCT/US95/15483", Date of completion - Apr. 24, 1996; Authorized Officer - P. Schenkels.
Adve, V. S., et al., "Performance Analysis of Mesh Interconnection Networks with Deterministic Routing", *Transactions on Parallel and Distributed Systems*, 5(5), (Mar. 1994),225-246.
Bolding, Kevin , "Non-Uniformities Introduced by Virtual Channel Deadlock Prevention", Technical Report Jul. 7, 1992, Department of Computer Science and Engineering, FR-35 University of Washington; Seattle, WA 98195, (Jul. 21, 1992).
Bolla, R., "A Neural Strategy for Optimal Multiplexing of Circuit and Packet-Switched Traffic", *Proceedings, IEEE Global Telecommunications Conference*, (1992), 1324-1330.
Boura, Y. M., et al., "Efficient Fully Adaptive Wormhole Routing in n-dimensional Meshes", *Proceedings , International Conference of Distributed Computing Systems*, (Jun. 1994),589-596.

Bundy, A. , et al., "Turning Eureka Steps in Calculations in Automatic Program Synthesis", *Proceedings of UK IT 90*, (IEE Conf. Pub. 316) (DAI Research Paper 448), (1991),221-226.
Carlile, Bradley R., "Algorithms and Design: The CRAY APP Shared-Memory System", *COMPCON Spring '93. Digest of Papers.*, (Feb. 22, 1993),312-320.
Chen, Y., et al., "UTLB: A Mechanism for Address Translation on Network Interfaces", *Proceedings of the Eighth International Conference on Architectural Support for Programming Languages and Operating Systems (ASPLOS)*, (1998), 193-204.
Chien, A. A., et al., "Planar-Adaptive Routing: Low-Cost Adaptive Networks for Multiprocessors", *Proceedings 19th International. Symposium on Computer Architecture*, (May 1992),268-277.
Dally, W. J., et al., "Deadlock-Free Adaptive Routing in Multicomputer Networks Using Virtual Channels", *IEEE Transactions on Parallel and Distributed Systems*, 4(4), (Apr. 1993),466-475.
Dally, William , et al., "Deadlock-Free Message Routing in Multi-processor Interconnection Networks", *IEEE Transactions on Computers*, C-36, (May 1987),547-553.
Dally, William , "Performance Analysis of k-ary n-cube Interconnection Networks", *IEEE Transactions on Computers*, 39(6), (Jun. 1990),775-785.
Dally, W. J., "Virtual Channel Flow Control", *Proceedings, 17th International Symposium on Computer Architecture*, (May 1990),60-68.
Duato, J. , "A New Theory of Deadlock-Free Adaptive Routing in Wormhole Networks", *IEEE Transactions on Parallel and Distributed Systems*, 4(12), (Dec. 1993),1320-1331.
Faanes, G. J., et al., "Decoupled Vector Architecture", U.S. Appl. No. 10/643,586, filed Aug. 18, 2003, 47 pages.
Gail, et al., "Tera Hardware-Software are cooperation", *ACM*, FOAR,(1997), 1-16 pgs.
Gallager, Robert , "Scale Factors for Distributed Routing Algorithm", *NTC '77 Conference Record*, vol. 2, (1977),28:2-1 - 28:2-5.
Glass, C. J., et al., "The Turn Model for Adaptive Routing", *Proceedings, 19th International Symposium on Computer Architecture*, (May 1992),278-287.
Gravano, L , et al., "Adaptive Deadlock- and Livelock-Free Routing with all Minimal Paths in Torus Networks", *IEEE Transactions on Parallel and Distributed Systems*, 5(12), (Dec. 1994), 1233-1251.
Gupta, Rajiv , et al., "High Speed Synchronization of Processors Using Fuzzy Barriers", *International Journal of Parallel Programming* 19(1), (Feb. 1990),53-73.
Hennessy, John L., "Computer Organization and Design - The Hardware/Software Interface", *Virtual Memory*, (1998),593.
Hennessy, et al., "Computer Organization and Design The Hardware/Software Interface", Morgan Kaufmann Publishers, Inc., (1998),606.
Ishihata, Hiroaki, et al., "Architecture of Highly Parallel AP1000 Computer", *Systems and Computers in Japan*, 24(7), (1993),69-76.
Jesshope, C. R., et al., "High Performance Communications in Processor Networks", *Proc. 16th International Symposium on Computer Architecture*, (May 1989),pp. 150-157.
Kirkpatrick, S. , et al., "Optimization by Simulated Annealing", *Science*, 220(4598), (May 13, 1983),671-680.
Kontothanassis, L. , et al., "VM-based shared memory on low-latency, remote-memory-access networks", *Proceedings of the ACM ISCA '97*, (1997), 157-169.
Linder, Daniel H., et al., "An Adaptive and Fault Tolerant Wormhole Routing Strategy for k-ary n-cubes", *IEEE Transactions on Computers*,40(1), (1991),2-12.
Lui, Z , et al., "Grouping Virtual Channels for Deadlock-Free Adaptive Wormhole Routing", *5th International Conference, Parallel Architectures and Languages Europe (PARLE '93)* (Jun. 14-17, 1993),254-265.
Nuth, Peter, et al., "The J-Machine Network", *Proceedings of the IEEE International Conference on Computer Design on VLSI in Computer & Processors*, (1992),420-423.
O'Keefe, Matthew T., et al., "Static Barrier MIMD: Architecture and Performance Analysis", *Journal of Parallel and Distributed Computing*, 25(2), (Mar. 25, 1995), 126-132.
Scott, S. L., "Decoupled Store Address and Data in a Multiprocessor System", U.S. Appl No. 10/643,742, filed Aug. 18, 2003, 27 pages.

Scott, S. L., "Latency Tolerant Distributed Shared Memory Multi-processor Computer", U.S. Appl. No. 10/643,585, filed Aug. 18, 2003, 17 pages.

Scott, S. L., et al., "Multistream Processing Memory-and Barrier Synchronization Method and Apparatus", U.S. Appl. No. 10/643,741, filed Aug. 18, 2003, 143 pages.

Scott, S. L., et al., "Relaxed Memory Consistency Model", U.S. Appl. No. 10/643,754, filed Aug. 18, 2003, 144 pages.

Scott, S., "Synchronization and Communication in the T3E Multi-processor", *ASPLOS*, vol. II, (1996),pp. 26-36.

Sheets, K., et al., "Remote-Translation Mechanism for a Multinode System", U.S. Appl. No. 10/643,758, filed Aug. 18, 2003, 42 pages.

Shumway, M., "Deadlock-Free Packet Networks", *Transputer Research and Applications 2, NATUG-2 Proceedings of the Second Conference of the North American Transputer Users Group*, (Oct. 18-19, 1989), 139-177.

Snyder, L., "Introduction to the Configurable, Highly Parallel Computer", *IEEE Computer* 15(1), (Jan. 1982),47-56.

Talia, D., "Message-Routing Systems for Transputer-Based Multicomputers", *IEEE Micro*, 13(3), (Jun. 1993),62-72.

Wang, Weilin, et al., "Trunk Congestion Control in Heterogeneous Circuit Switched Networks", *IEEE Transactions on Communications*, 40(7), (Jul. 1992),1156-1161.

Wood, D. A., et al., "An In-Cache Address Translation Mechanism", *Proceedings of the 13th Annual International Symposium on Computer Architecture*, (1986),358-365.

Wu, Min-You, et al., "DO and FORALL: Temporal and Spatial Control Structures", *Proceedings, Third Workshop on Compilers for Parallel Computers, ACPC/TR*, (Jul. 1992),258-269.

Yang, C. S., et al., "Performance Evaluation of Multicast Wormhole Routing in 2D-Torus Multicomputers", *Proceedings, Fourth International Conference on Computing and Information (ICCI '92)*, (1992), 173-178.

Yantchev, J., et al., "Adaptive, Low Latency, Deadlock-Free Packet Routing for Networks of Processors", *IEEE Proceedings*, 136, Part E, No. 3, (May 1989), 178-186).

U.S. Appl. No. 10/643,727, Notice of Allowance mailed Apr. 28, 2008, NOAR, 8.

U.S. Appl. No. 10/643,741, Supplemental Notice of Allowability mailed Mar. 25, 2008, (Mar. 25, 2008), 6 pgs.

U.S. Appl. No. 10/643,742, Non-Final Office Action mailed Apr. 9, 2008, OARN, 16 pgs.

U.S. Appl. No. 10/643,754, Amendment and Response filed Mar. 26, 2008 to Final Office Action mailed Sep. 26, 2007, 12 pgs.

U.S. Appl. No. 10/643,754, Non-Final Office Action mailed Jun. 25, 2008, OARN, 2 pgs.

U.S. Appl. No. 10/643,741, Notice of Allowance mailed Jun. 9, 2008, NOAR, 2 pgs.

U.S. Appl. No. 10/643,758, Notice of Allowance mailed Jun. 16, 2008, NOAR, 5 pgs.

U.S. Appl. No. 10/643,769, Notice of Allowance mailed Jun. 2, 2008, NOAR, 5 pgs.

U.S. Appl. No. 10/643,577, Final Office Action mailed May 30, 2008, FOAR, 13 pgs.

Handy, J., "The Cache Memory Book", *Academic Press*, (1993), 73-84.

U.S. Appl. No. 10/643,577, Advisory Action mailed Sep. 11, 2008, 3 pgs.

U.S. Appl. No. 10/643,577, Final Office Action mailed Nov. 2, 2006, 11 pgs.

U.S. Appl. No. 10/643,577, Response filed Oct. 30, 2008 to Final Office Action mailed May 30, 2008, 11 pgs.

U.S. Appl. No. 10/643,577, Response filed Sep. 2, 2008 to Final Office Action mailed May 30, 2008, 12 pgs.

U.S. Appl. No. 10/643,577 Notice of Allowance mailed on Dec. 3, 2008, 16 pgs.

U.S. Appl. No. 10/643,587, Non-Final Office Action mailed Jul. 9, 2008, 15 pgs.

U.S. Appl. No. 10/643,587, Response filed Apr. 30, 2008 to Final Office Action mailed Oct. 31, 2007, 10 pgs.

U.S. Appl. No. 10/643,738, Advisory Action mailed Jul. 31, 2007, 3 pgs.

U.S. Appl. No. 10/643,742, Response filed Oct. 9, 2008 to Non Final Office Action mailed Apr. 9, 2008, 15 pgs.

U.S. Appl. No. 10/643,754, Advisory Action mailed Feb. 8, 2008, 3 pgs.

U.S. Appl. No. 10/643,758, Advisory Action mailed May 1, 2007, 3 pgs.

U.S. Appl. No. 10/643,758, Notice of Allowance mailed Jun. 16, 2008, 6 pgs.

U.S. Appl. No. 10/643,758, Notice of Allowance mailed Jul. 19, 2007, 4 pgs.

U.S. Appl. No. 10/643,769 Notice of Allowance mailed Oct. 29, 2008, 2 pgs.

U.S. Appl. No. 10/643,758, Non Final Office Action Mailed Oct. 8, 2008, 12 pgs.

Collins, J. D, et al., "Hardware Identification of Cache Conflict Misses," IEEE, 32nd Annual International Symposium on Microarchitecture (Nov. 18, 1999), pp. 126-135.

US 7,243,211, 07/2007, Kohn (withdrawn)

* cited by examiner

LATENCY TOLERANT DISTRIBUTED SHARED MEMORY MULTIPROCESSOR COMPUTER

RELATED APPLICATIONS

This application is related to U.S. patent application Ser. No. 10/643,742, entitled "Decoupled Store Address and Data in a Multiprocessor System", filed on even date herewith; to U.S. patent application Ser. No. 10/643,586, entitled "Decoupled Vector Architecture", filed on even date herewith; to U.S. patent application Ser. No. 10/643,727, entitled "Method and Apparatus for Indirectly Addressed Vector Load-Add-Store Across Multi-Processors", filed on even date herewith; to U.S. patent application Ser. No. 10/643,754, entitled "Relaxed Memory Consistency Model", filed on even date herewith; to U.S. patent application Ser. No. 10/643,758, entitled "Remote Translation Mechanism for a Multinode System", filed on even date herewith; and to U.S. patent application Ser. No. 10/643,741, entitled "Multistream Processing Memory-And Barrier-Synchronization Method And Apparatus", filed on even date herewith, each of which is incorporated herein by reference.

TECHNICAL FIELD

This document relates to computer system technology, and, in particular, to a computer system tolerant of memory access latency.

BACKGROUND

Distributed computer system designs based on clusters of relatively inexpensive microprocessors have become popular. However, there is still a need for Vector Processing Computer Systems that are able to handle calculation-intensive problems on a large amount of data. Traditional vector systems do not scale to a large number of processors due to their system architectures. Previous vector machines tended to have a limited number of processors clustered around a shared memory. The shared memory was developed to minimize communication costs when sharing data between processors.

Microprocessor-based machines on the other hand, suffer from limitations in the number of outstanding memory references they can handle. This makes it difficult for microprocessor-based machines to tolerate high memory access latencies. In addition, microprocessor-based machines use a memory subsystem based on cache line granularity, which is inefficient when accessing single words. What is needed is a computer system structure scalable to a large number of processors yet can tolerate hundreds of outstanding memory references.

DETAILED DESCRIPTION

In the following detailed description, reference is made to the accompanying drawings which form a part thereof, and in which is shown by way of illustration specific embodiments in which the invention may be practiced. Other embodiments may be used and structural changes may be made without departing from the scope of the present invention.

The computer system structure of the present application is comprised of interconnected processing nodes. Each processing node is comprised of a number of Multi-Streaming Processors (MSPs), a number of cache memories, and a number of local memories.

Figure 1:
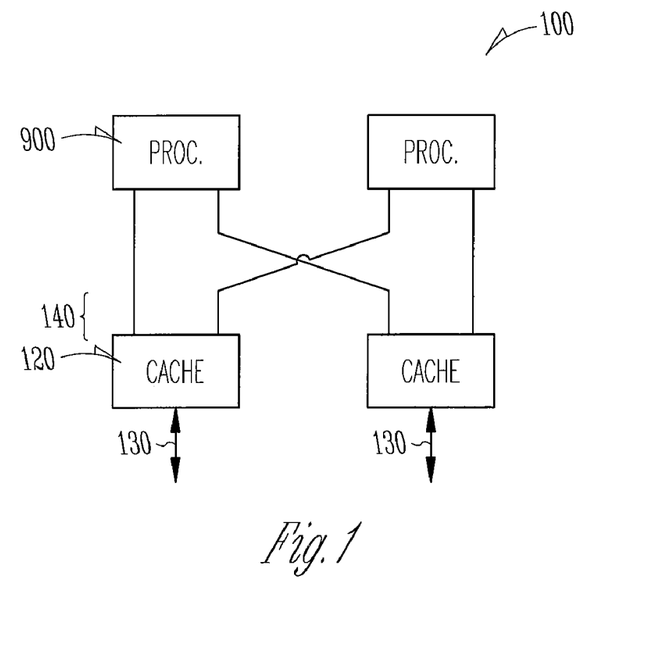
FIGS. 1-4 show block diagrams of MSPs scaled from 2 processors, 2 cache memories, and 2 local memory ports in FIG. 1, to 4 processors, 4 cache memories, and 16 local memory ports in FIG. 4.

FIG. 1 shows one embodiment of an MSP 100. The MSP 100 includes two processors 900 and two cache memories 120.

In some embodiments, an MSP includes synchronization features that allow for low-latency synchronization. In various embodiments, these features allow for synchronization of multiple processors within an MSP and among various MSPs. This allows individual processors to be applied at different levels of parallelism by a compiler, making the processors more flexible than a single processor. For a fuller description of these synchronization features, please refer to the U.S. patent applications entitled "Multistream Processing System and Method", filed on even date herewith, "System and Method for Synchronizing Memory Transfers", file on even date herewith, and "Method and Apparatus for Local Synchronizations in a Vector Precessing System", filed on even date herewith, the descriptions of which are hereby incorporated by reference.

Figure 9:
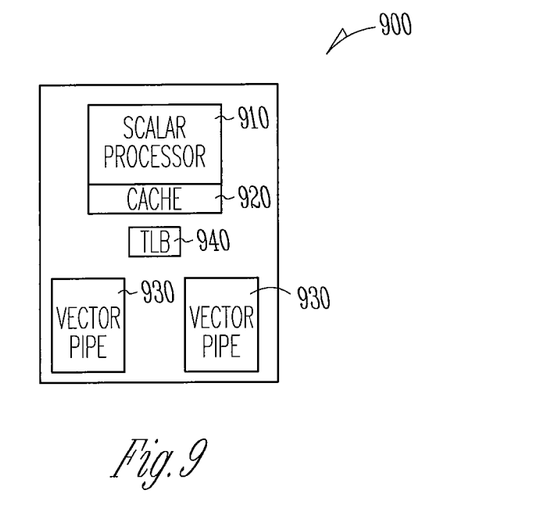
FIG. 9 shows a block diagram of one embodiment of a processor for use in a computer system.

FIG. 9 shows one embodiment of processor 900. Each processor 110 is composed of a scalar processor 910, two vector pipes 930 and a Translation Look-aside Buffer (TLB) 940. The scalar and vector unit are decoupled with respect to instruction execution and memory accesses. Decoupling with respect to instruction execution means the scalar unit can run ahead of the vector unit to resolve control flow issues and execute address arithmetic. Decoupling with respect to memory accesses means both scalar and vector loads are issued as soon as possible after instruction dispatch. Instructions that depend upon load values are dispatched to queues where they await the arrival of the load data. Store addresses are computed early and their addresses saved for later use. Each scalar processor 910 is capable of decoding and dispatching one vector instruction (and accompanying scalar operand) per cycle. Instructions are sent in order to the vector units, and any necessary scalar operands are sent later after the vector instructions have flowed through the scalar unit's integer or floating point pipeline and read the specified registers. Vector instructions are not sent speculatively; that is, the flow control and any previous trap conditions are resolved before sending the instructions to the vector unit. For a further description of decoupled vector architecture please refer to the U.S. patent application entitled "Decoupled Vector Architecture", filed on even date herewith, the description of which is hereby incorporated by reference.

In another embodiment, processor 900 contains a cache memory 920 for scalar references only. Local MSP cache coherence is maintained by requiring all data in processor cache memory 920 to be contained in MSP cache memory 120.

Within MSP 100 in FIG. 1, each cache memory 120 is shared by each processor 900. Each cache memory includes two processor ports 140 to allow sharing by processors 900, and one memory port 130 for accessing local memory 1000. Thus each MSP 100 contains two local memory ports 130.

Figure 2:
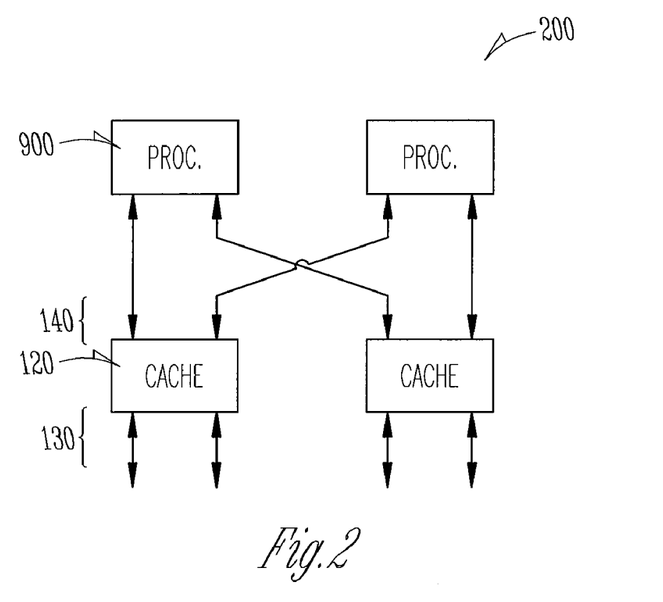

FIG. 2 shows another embodiment of an MSP 200. The MSP 200 is composed of two processors 900 and two cache memories 120. Each cache memory 120 includes two processor ports 140 to allow sharing by each processor 900 and also includes two memory ports 130 for addressing local memory 1000. Thus each MSP 200 contains four local memory ports 130.

Figure 3:
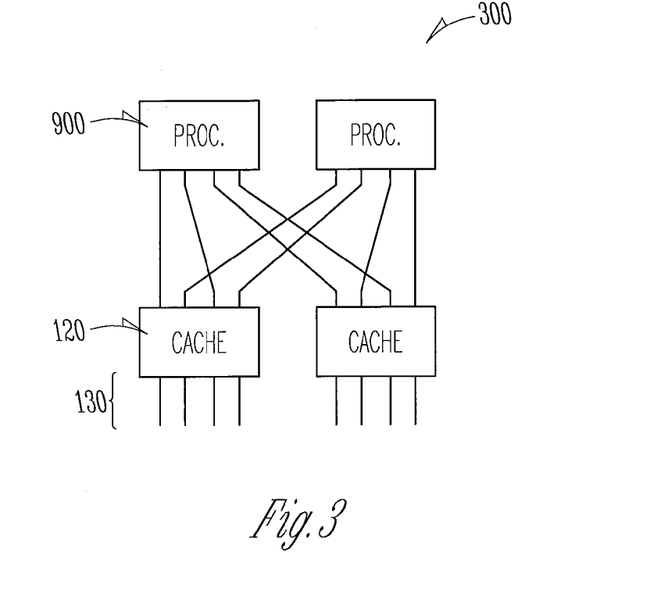

FIG. 3 shows another embodiment of an MSP 300. The MSP 300 is composed of two processors 900 and two cache memories 120. Each cache memory includes four processor ports 140 and also includes four memory ports 130 for addressing local memory 1000. Thus in this embodiment each MSP 300 contains eight local memory ports 130.

Figure 4:
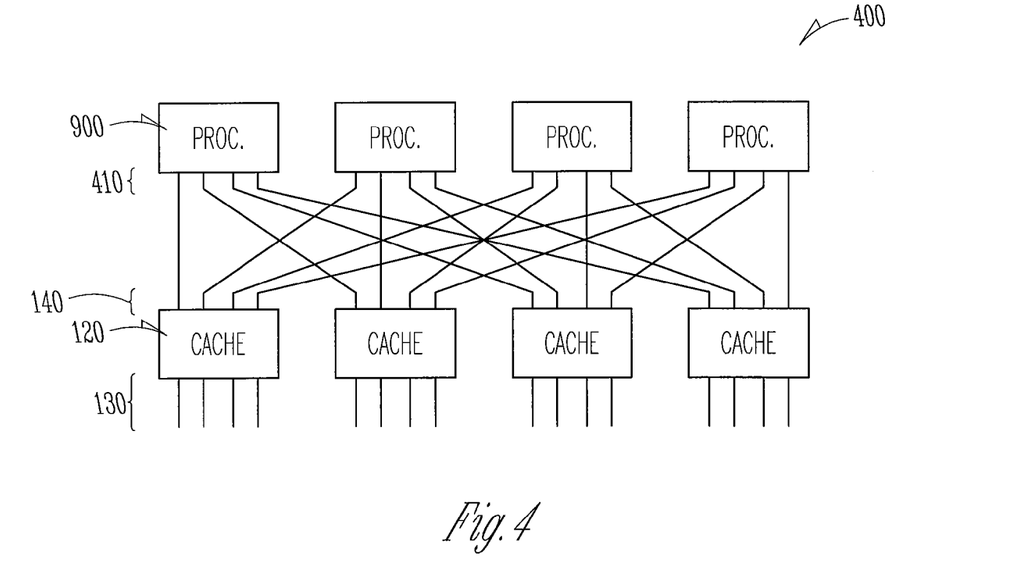

FIG. 4 shows another embodiment of an MSP 400. The MSP 400 is composed of four processors 900 and four cache memories 120. Each cache memory 120 includes four processor ports 140 to allow sharing by the four processors 900. The processor connections 410 are connected round robin across the cache memory ports 140. Each cache memory 120 also includes four ports 130 for addressing local memory 1000. Thus in this embodiment each MSP 400 contains sixteen local memory ports 130.

Figure 5:
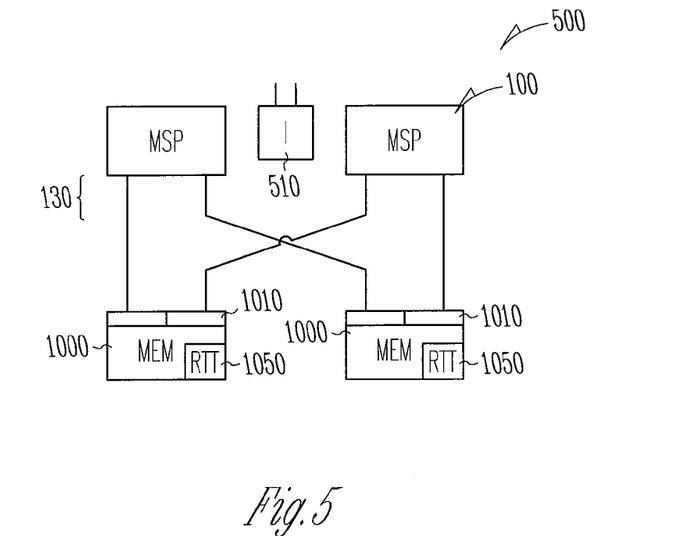
FIGS. 5-8 show block diagrams processing nodes scaled from 2 MSPs and 2 local memories in FIG. 5, to 4 MSPs and 16 local memories in FIG. 8.

FIG. 5 shows one embodiment of a processing node 500. The processing node 500 includes two MSPs 100 each having two local memory ports 130, one I/O channel controller 510, and two local memories 1000. Each local memory includes two MSP ports 1010. Thus each processor 900 in FIG. 1 can access each local memory 1000 in FIG. 5.

Figure 6:
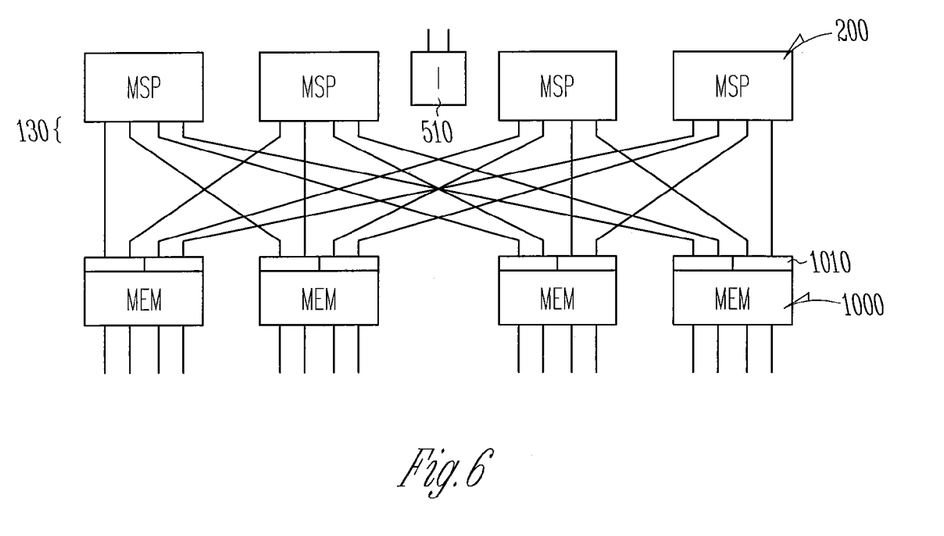

FIG. 6 shows another embodiment of a processing node 600. The processing node 600 includes four MSPs 200 each having four local memory ports 130, one I/O channel controller 510, and four local memories 1000. Each local memory includes four MSP ports 1010. Thus each processor 900 in FIG. 2 has access to each local memory 1000 in FIG. 6.

Figure 7:
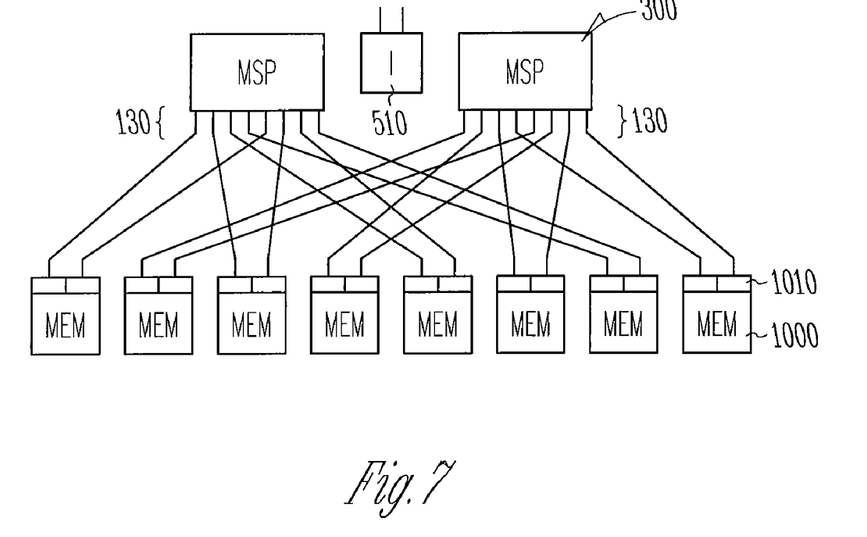

FIG. 7 shows another embodiment of a processing node 700. The processing node 700 includes two MSPs 300 each having eight local memory ports 130, one I/O channel controller 510, and eight local memories 1000. Each local memory includes two MSP ports 1010. Thus each processor 900 in FIG. 3 has access to each local memory 1000 in FIG. 7.

Figure 8:
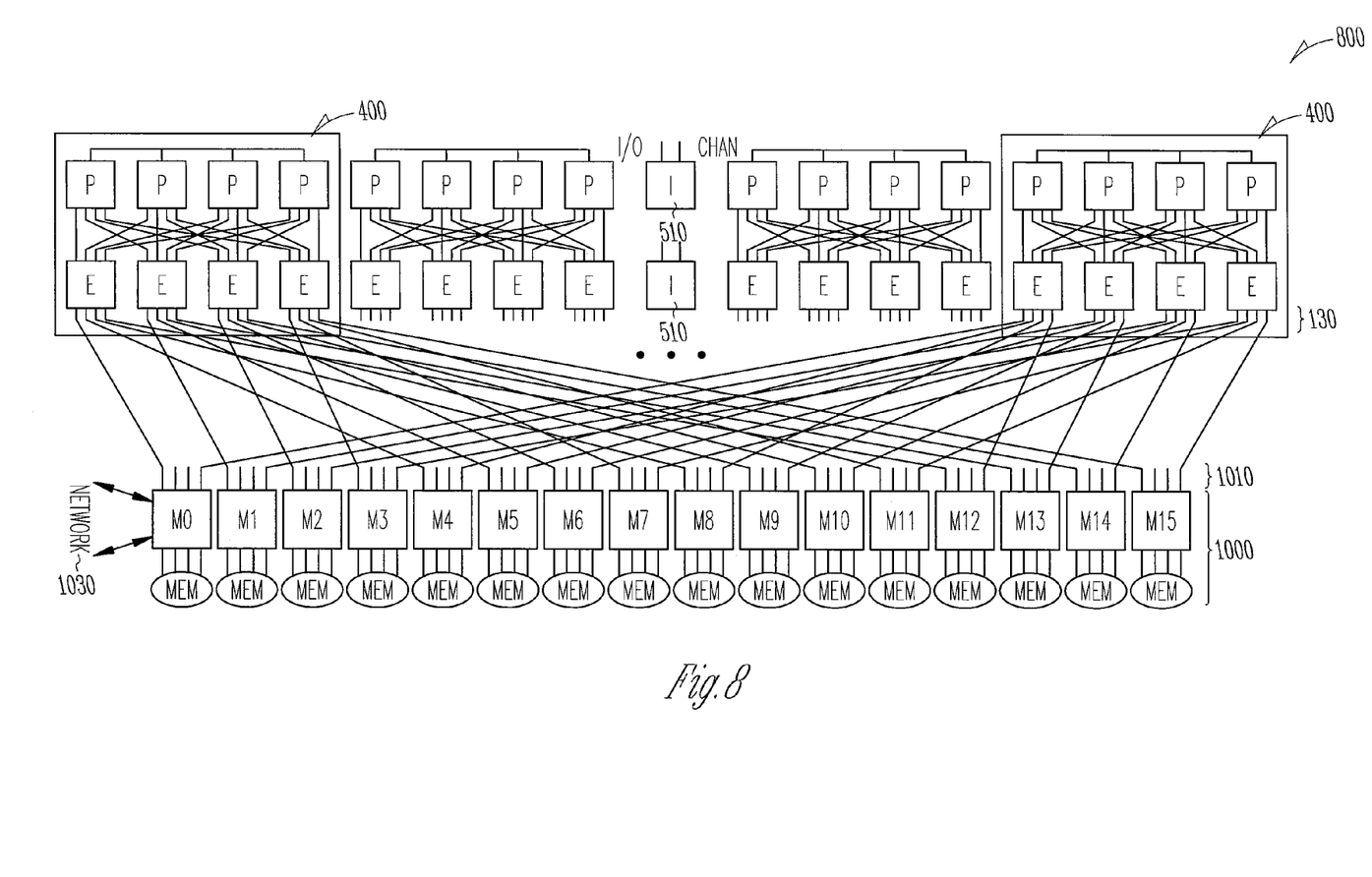

FIG. 8 shows another embodiment of a processing node 800. The processing node 800 includes four MSPs 400 each having sixteen local memory ports 130, two I/O channel controllers 510, and sixteen local memories 1000. Each local memory includes four MSP ports 1010. Thus each processor 900 in FIG. 4 can access each local memory 1000 in FIG. 8.

The embodiments illustrated in FIGS. 5 through 8 show how the computer system can be scaled from two to sixteen processors. The embodiments allow further scaling when the processing nodes 500, 600, 700, 800 are interconnected. Each local memory 1000 of each processing node 500, 600, 700, 800 includes two network ports 1030 for interconnecting the local memories 1000.

In one embodiment, processing nodes 500, 600, 700, 800 are interconnected by connecting the local memories 1000 of one processing node 500, 600, 700, 800 to the corresponding local memory 1000 of two other processing nodes. In this way four processing nodes can be interconnected into a two-dimensional hypercube, or square. Each local memory 1000 of each processing node 500, 600, 700, 800 resides in one independent, parallel slice of the computer system and connectivity is only provided between corresponding local memories 1000 on the processing nodes. Thus for the processing node 800 of FIG. 8 there are sixteen parallel, independent networks.

The region of memory belonging to each independent network slice at a given node is called a section. In some embodiments, cache lines are mapped round-robin across the 16 sections of a node, using physical address bits 8 . . . 5. Thus, the memory on a single node is uniformly shared by all MSPs on that node via the MSP_to_M-chip, on-node network. An M-chip functions as the routing hub for all traffic to memory, I/O, and to the network for all data from a node for a single slice of the address space. The M chip is one sector of a slice and supports 1 or 2 daughter cards or 4 or 8 memory-channels. In some embodiments, each network slice is interconnected via its own independent network, which connects together all M-chips as shown in FIG. 8 (i.e., M0-M15) in system belonging to the same slice. Each M-chip M0-M15 contains two network ports 1030 for this purpose. Memory references by an MSP are first routed to the local M-chip of the appropriate slice. From there, they either access local memory, or route to the correct destination node on the network for that slice. Each slice of the machine independently handles all memory accesses and routing for addresses that map to that slice.

In another embodiment, one network port 1030 of the local memory 1000 of a processing node 500, 600, 700, 800 is connected to the corresponding local memory 1000 of the neighboring board and the other network port 1030 is connected to a router. Thus, for two processing nodes 800 of the embodiment shown in FIG. 8, there are thirty-two local memory-to-router connections and these connect to thirty-two parallel, independent networks.

In another embodiment, an eight-ported router is used to connect four local memories 1000 leaving four router ports available for router-to-router connections. Each of the thirty-two parallel networks grows as a hypercube up to sixteen routers per parallel slice (512 total MSPs) and then as a 2D torus up to a maximum of a 4096 MSP system.

Thus the computer system supports scaling from a one MSP system of two processors to a 4096 MSP system of 4 processors per MSP.

Figure 10:
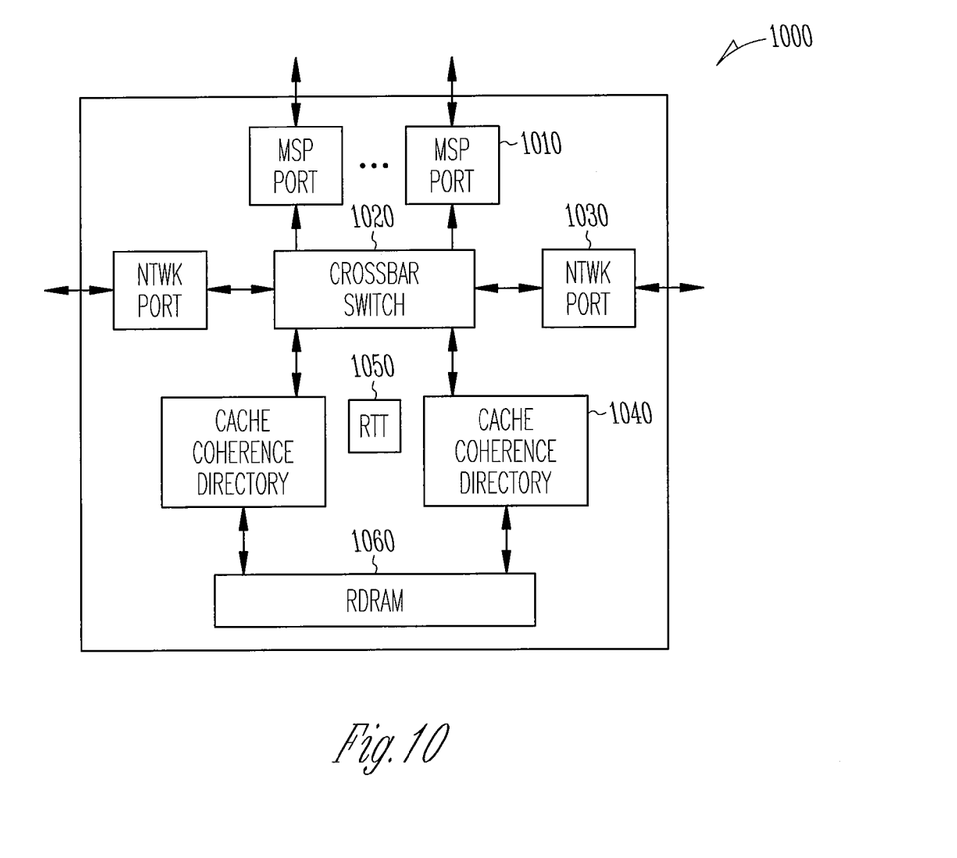
FIG. 10 shows a block diagram of one embodiment of a local memory used in a computer system.

FIG. 10 shows one embodiment of local memory 1000 used in the processing node 500 of FIG. 5. In this embodiment, local memory includes two MSP ports 1010, two Cache Coherence Directories 1040, a crossbar switch 1020, two network ports 1030, a Remote Address Translation Table (RTT) 1050, and RAM 1060. Remote Translation Table (RTT) 1050 translates addresses originating at remote processing nodes 500, 600, 700, 800 to physical addresses at the local node. In some embodiments, this includes providing a virtual memory address at a source node, determining that the virtual memory address is to be sent to a remote node, sending the virtual memory address to the remote node, and translating the virtual memory address on the remote node into a physical memory address using a RTT. The RTT contains translation information for an entire virtual memory address space associated with the remote node. Another embodiment of RTT provides for translating a virtual memory address in a multi-node system. The method includes providing a virtual memory address on a local node by using a virtual address of a load or a store instruction, identifying a virtual node associated with the virtual memory address, and determining if the virtual node corresponds to the local node. If, instead, the virtual node corresponds to a remote node, then the method includes sending the virtual memory address to the remote node, and translating the virtual memory address into a physical memory address on the remote node.

Figure 11:
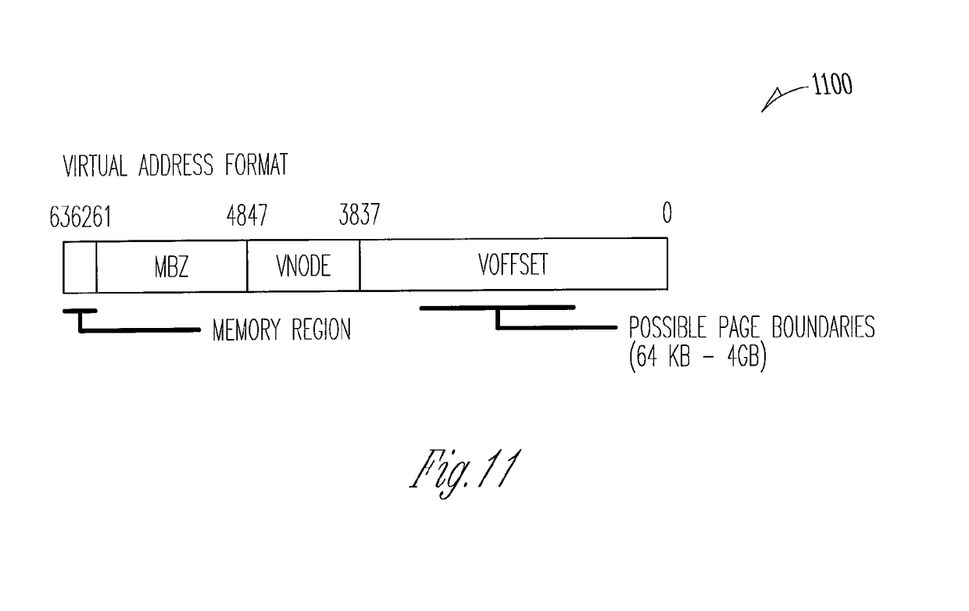
FIG. 11 illustrates a format for a virtual memory address.

FIG. 11 illustrates a format for a virtual memory address, according to one embodiment. In this embodiment, virtual memory address format 1100 contains a 64-bit virtual address space. Bits 37 . . . 0 represent a virtual offset into virtual memory space, wherein potential page boundaries range from 64 KB to 4 GB. Bits 47 . . . 38 represent the Vnode (i.e. virtual node). This is used by the hardware when performing remote address translation. Bits 61 . . . 48 must be set to zero in this implementation. Bits 63 . . . 62 specify the memory region, which determines the type of address translation used in kernel mode. The virtual address space can be considered a flat virtual address space for uniprocessor, or symmetric multiprocessing applications. As stated, this embodiment supports eight page sizes ranging from 64 KB to 4 GB. Thus, the page boundary can vary, from between bits 15 and 16, to between bits 31 and 32.

In various embodiments of the invention, virtual addresses used for instruction fetches and data references are first translated into physical addresses before memory is accessed. These embodiments support two forms of address translation: source translation, and remote translation. The first form of address translation is source translation, in which a virtual address is fully translated by a Translation Look-aside Buffer (TLB) on a local P chip to a physical address on an arbitrary node. The second form of address translation is remote translation, in which the physical node number is determined by a simple translation of the virtual address Vnode field, and the remaining virtual address VOffset field is sent to the remote node to be translated into a physical address offset via a Remote-Translation Table (RTT). The type of address translation performed is based upon values in a configuration control register and the virtual address itself. Remote translation is performed if all of the following three conditions are true: (1) Remote translation is enabled (e.g., a flag contained in the configuration control register is set); (2) The virtual address is to the user region (Bits 63 . . . 62=00 in the virtual address): and (3) The virtual address references a remote node (Bits 47 . . . 38 in the virtual address are not equal to a local node value contained in the configuration control register). If any of the above conditions are false, then source translation is performed. Remote translation can be enabled/disabled on a per-processor basis.

Figure 12:
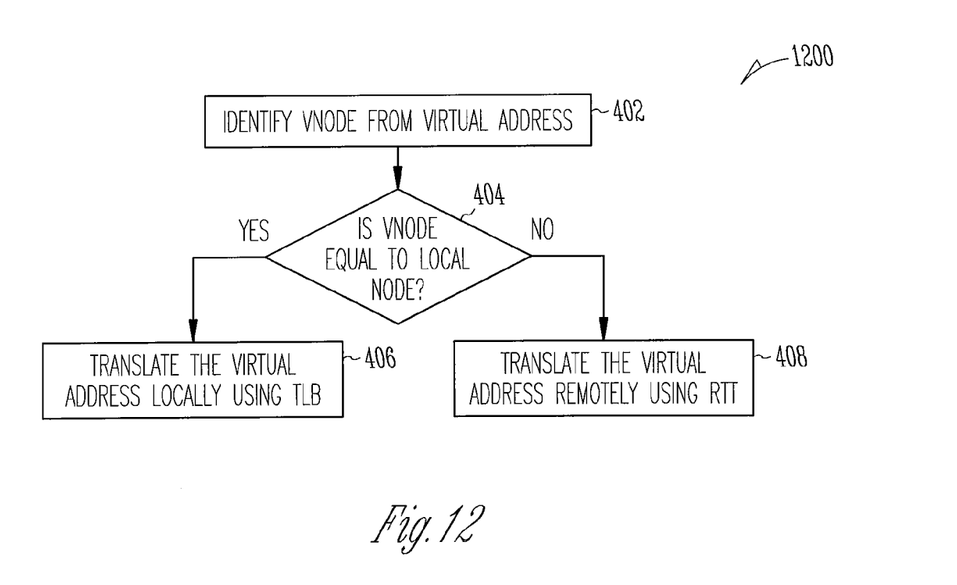
FIG. 12 illustrates a method for analyzing a VNODE field.

FIG. 12 illustrates a flow diagram for analyzing a VNode field in the virtual memory address, according to one embodiment of the present invention. Flow diagram 1200 includes blocks 402, 406, and 408, and also includes checkpoint 404. Flow diagram 1200 illustrates one way in which a virtual memory address can be translated into a physical memory address (in either local or remote memory space). Block 402 includes identifying the virtual node from a virtual address. In one implementation, a local node can identify the virtual node by looking at the VNode field of the virtual address. Checkpoint 404 determines if the virtual node is the same as, or equal to, the local node. If so, flow diagram 1200 continues to block 406, wherein the virtual address is translated into a physical address locally using a Translation Look-Aside Buffer (TLB). The local node is then able to address local physical memory space. If the virtual node is not the same as the local node, then flow diagram 1200 continues to block 408, wherein the virtual address is translated into a physical address remotely (on a remote node) using a Remote-Translation Table (RTT). In this fashion, the local node is effectively able to address remote memory space of the remote node.

For a further description of RTTs please refer to the U.S. patent application entitled "Remote Translation Mechanism for a Multi-node System", U.S. application Ser. No. 10/235, 898, filed Sep. 4, 2002; "Remote Translation Mechanism for a Multinode System", filed on even date herewith, and "Method for Sharing a Memory within an Application Using Scalable Hardware Resources", filed on even date herewith, the description of which are hereby incorporated by reference.

The Cache Coherence Directories 1040 keep track of the contents of the MSP cache memories 120 in the processing node 500. Only cache memories 120 from the local processing node 500, 600, 700, 800 are allowed to cache data from that node. Each coherence directory 1040 included in the local memory 1000 corresponds to one bank of MSP cache memory 120. There is one cache coherence directory 1040 entry for every MSP cache line on the processing node 500, 600, 700, 800. Thus the directories hold entries only for a subset of the total local memory lines, and do not need to include entries for all of the non-cached memory lines. The Cache Coherence Directories 1040 are designed to support very high access rates generated by the processing nodes 500. For a further description of Cache Coherence Directories please refer to the application entitled "Optimized High Bandwidth Cache Coherence Mechanism", U.S. application Ser. No. 10/368,090, filed Feb. 18, 2003, the description of which is hereby incorporated by reference.

In addition to promoting scaling, the partitioning in the above embodiments results in a scalable, shared address space distributed across the entire computer system that is tolerant of memory latencies by allowing direct load store access to all memory. This improves sustained bandwidth capabilities in the system. All activity (E.g. cache, local memory, or network transfers) relating to an area of memory stays within the corresponding system slice. Most single processor tasks will run local to the node. Latency of a memory request to a remote processing node depends upon the distance to the remote processing node and the level of contention in the network. For a further description of load store operations please refer to the U.S. patent applications entitled "Indirectly Addressed Vector Load-Operate-Store Method and Apparatus", filed on even date herewith, "Method and Apparatus for Indirectly Addressed Vector Load-Add-Store Across Multi-processors", filed on even date herewith, and "System and Method for Processing Memory Instructions", filed on even date herewith, the descriptions of which are hereby incorporated by reference.

What is claimed is:

1. A computer system comprising:
   a network;
   one or more processing nodes connected via the network, wherein each processing node includes:
      a plurality of processors, wherein each processor includes a scalar processing unit, a vector processing unit, means for operating the scalar processing unit independently of the vector processing unit, a processor cache and a translation look-aside buffer (TLB), wherein the scalar processing unit places instructions for the vector processing unit in a queue for execution by the vector processing unit and the scalar processing unit continues to execute additional instructions; and
      a shared memory, wherein the shared memory is connected to each of the processors within the processing node, wherein the shared memory includes a Remote Address Translation Table (RTT), wherein the RTT contains translation information for an entire virtual memory address space associated with the processing node and wherein the RTT translates memory addresses received from other processing nodes such that the memory addresses are translated into physical addresses within the shared memory;

wherein processors on one node can load data directly from and store data directly to shared memory on another processing node via addresses that are translated on the other processing node using the other processing node's RTT; and wherein each TLB in a corresponding processing node exists separate from the RTT in that processing node and wherein each TLB translates memory references from its associated processor to the shared memory on its processing node.

2. The computer system of claim 1, wherein the shared memory further includes a plurality of cache coherence directories, wherein each processing node is coupled to one of the cache coherence directories.

3. The computer system of claim 1, wherein each processor includes two vector pipelines.

4. The computer system of claim 1, wherein the processing nodes include at least one input/out (I/O) channel controller, wherein each I/O channel controller is coupled to the shared memory of the processing node.

5. The computer system of claim 1, wherein each scalar processing unit contains a scalar cache memory, wherein the scalar cache memory contains a subset of cache lines stored in the processor cache associated with its respective processor.

6. The computer system according to claim 1, wherein the network includes a router connecting one or more of the processing nodes.

7. A computer system comprising:

a network;

one or more processing nodes connected via the network, wherein each processing node includes:

four processors configured as a Multi-Streaming Processor, wherein each processor includes a scalar processing unit, a vector processing unit, means for operating the scalar processing unit independently of the vector processing unit, a processor cache connected to each of the processing units and a translation look-aside buffer (TLB), wherein the scalar processing unit places instructions for the vector processing unit in a queue for execution by the vector processing unit and the scalar processing unit continues to execute additional instructions; and a shared memory, wherein the shared memory is connected to each of the processors within the processing node, wherein the shared memory includes a Remote Address Translation Table (RTT), wherein the RTT contains translation information for an entire virtual memory address space associated with the processing node and wherein the RTT translates memory addresses received from other processing nodes such that the memory addresses are translated into physical addresses within the shared memory;

wherein processors on one node can load data directly from and store data directly to shared memory on another processing node via addresses that are translated on the other processing node using the other processing node's RTT; and wherein each TLB in a corresponding processing node exists separate from the RTT in that processing node and wherein each TLB translates memory references from its associated processor to the shared memory on its processing node.

8. The computer system of claim 7, wherein the shared memory further includes a plurality of cache coherence directories, wherein each processing node is coupled to one of the cache coherence directories.

9. A method of providing latency tolerant distributed shared memory multiprocessor computer system, wherein the method of providing comprising:

connecting one or more processing nodes via a network, wherein each processing node includes:

a plurality of processors, wherein each processor includes a scalar processing unit, a vector processing unit, means for operating the scalar processing unit independently of the vector processing unit, a processor cache and a translation look-aside buffer (TLB), wherein the scalar processing unit places instructions for the vector processing unit in a queue for execution by the vector processing unit and the scalar processing unit continues to execute additional instructions; and a shared memory, wherein the shared memory is connected to each of the processors within the processing node, wherein the shared memory includes a Remote Address Translation Table (RTT), wherein the RTT contains translation information for an entire virtual memory address space associated with the processing node;

storing data from a processor on a first processing node to shared memory on a second processing node via the network, wherein storing includes translating via the RTT on the second processing node memory addresses received from the first processing node such that the memory addresses received from the first processing node are translated into physical addresses within the shared memory of the second processing node; and reading data from shared memory on the second processing node to the processor on the first processing node;

wherein memory references from the processor on the first processing node to the shared memory on the first processing node is translated by the associated TLB in the first processing node, wherein the TLB exists separate from the RTT in the first processing node.

10. The method of claim 9, wherein each shared memory includes a plurality of cache coherence directories and wherein connecting includes coupling each processing node to one of the cache coherence directories.

11. The method of claim 9, wherein each processing node includes at least one input/out (I/O) channel controller and wherein connecting includes coupling each I/O channel controller to the shared memory of the processing node.

12. The method of claim 9, wherein each scalar processing unit includes a scalar cache memory and wherein connecting includes having the scalar cache memory contain a subset of cache lines stored in the processor cache associated with its respective processor.

13. The method of claim 9, wherein connecting includes routing one or more of the processing nodes through a router.

14. A method of providing latency tolerant distributed shared memory multiprocessor computer system, wherein the method of providing comprising:

connecting one or more processing nodes via a network, wherein each processing node includes:

four processors configured as a Multi-Streaming Processor, wherein each processor includes a scalar processing unit, a vector processing unit, means for operating the scalar processing unit independently of the vector processing unit, a processor cache connected to each of the processing units and a translation look-aside buffer (TLB), wherein the scalar processing unit places instructions for the vector processing unit in a queue for execution by the vector processing unit and the scalar processing unit continues to execute additional instructions; and a shared memory, wherein the shared memory is connected to each of the processors within the processing node, wherein the shared memory includes a Remote Address Translation Table (RTT), wherein the RTT contains translation information for an entire virtual memory address space associated with the processing node;

storing data from a processor on a first processing node to shared memory on a second processing node via the network, wherein storing includes translating via the RTT on the second processing node memory addresses received from the first processing node such that the memory addresses received from the first processing node are translated into physical addresses within the shared memory of the second processing node; and reading data from shared memory on the second processing node to the processor on the first processing node;

wherein memory references from the processor on the first processing node to the shared memory on the first processing node is translated by the associated TLB in the first processing node, wherein the TLB exists separate from the RTT in the first processing node.

15. The method of claim 14, wherein the shared memory includes a plurality of cache coherence directories and wherein connecting includes coupling each processing node to one of the cache coherence directories.

* * * * *

UNITED STATES PATENT AND TRADEMARK OFFICE
CERTIFICATE OF CORRECTION

PATENT NO.         : 7,543,133 B1
APPLICATION NO. : 10/643585
DATED              : June 2, 2009
INVENTOR(S)        : Steven L. Scott It is certified that error appears in the above-identified patent and that said Letters Patent is hereby corrected as shown below:

Title Page; item(s) (56);
On page 2, in column 2, under "Other Publications", line 8, delete "verison" and insert -- version --, therefor.

On page 3, in column 1, under "Other Publications", line 16, delete "publsihers," and insert -- publishers, --, therefor.

On page 4, in column 1, under "Other Publications", line 72, delete "of" and insert -- on --, therefor.

On page 4, in column 2, under "Other Publications", line 1, delete "in" and insert -- into --, therefor.

In column 4, line 63, after "node." insert -- If the virtual node corresponds to the local node, then the method includes translating the virtual memory address into a local physical memory address on the local node. --.

In column 6, line 5, delete "description" and insert -- descriptions --, therefor.

Signed and Sealed this

Fourth Day of August, 2009

JOHN DOLL
*Acting Director of the United States Patent and Trademark Office*